Feb. 22, 1949.  B. DOWICK  2,462,476
DEVICE FOR MOUNTING SELECTIVE MULTIPLE PULLEYS
UPON AN ELECTRIC MOTOR DRIVE SHAFT
Filed Dec. 21, 1945
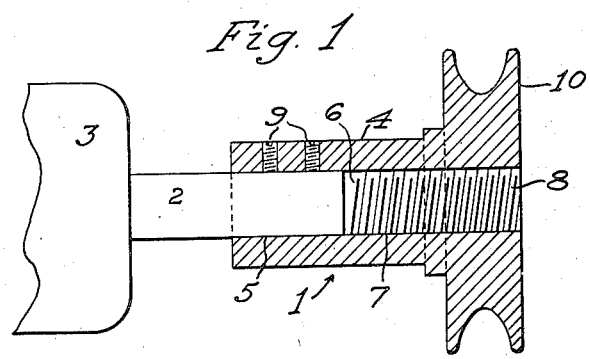
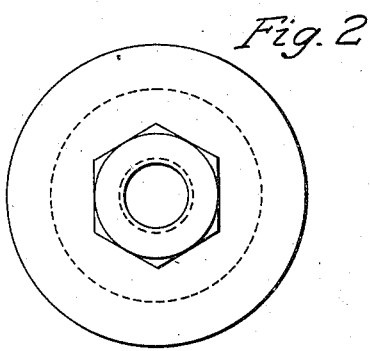
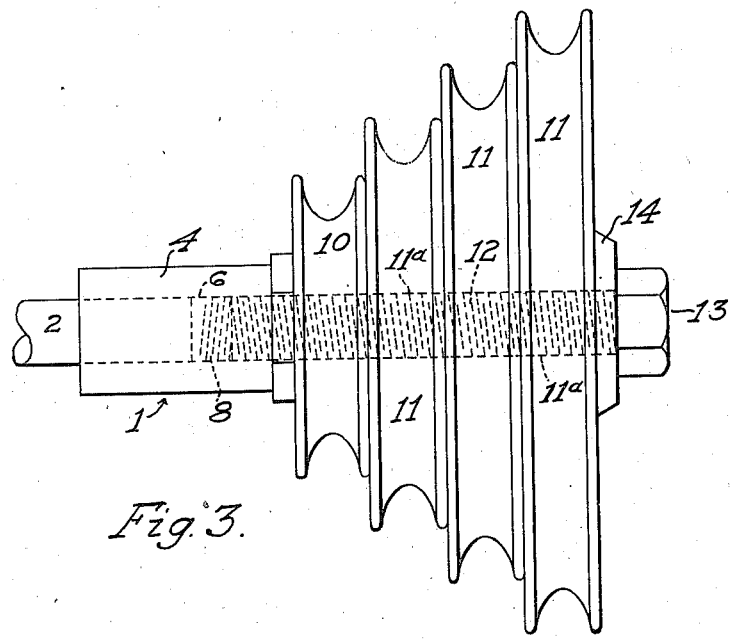
INVENTOR.
Benjamin Dowick.
BY Patented Feb. 22, 1949

2,462,476

UNITED STATES PATENT OFFICE 2,462,476

DEVICE FOR MOUNTING SELECTIVE MULTIPLE PULLEYS UPON AN ELECTRIC MOTOR DRIVE SHAFT

Benjamin Dowick, Jersey City, N. J.

Application December 21, 1945, Serial No. 636,439

1 Claim. (Cl. 287—53)

This invention relates to a device for therewith mounting selective multiple pulleys upon an electric motor drive shaft, and its principal object is to provide a simplified, inexpensive, conveniently and economically manufacturable, conveniently and efficiently utilizable, and improved device for such purpose.

Other objects and advantages will hereinafter appear.

In the accompanying drawings,

Fig. 1 is a longitudinal cross-sectional elevation of the device constituting the invention, taken on the line 1—1 of Fig. 2, and showing it as operatively mounted upon the electric motor drive shaft.

Fig. 2 is a rear end elevation of the device shown in Fig. 1.

Fig. 3 is an elevational view of the device, illustrating its adaptability for therewith mounting selective multiple pulleys upon the electric motor drive shaft.

The device 1, mountable upon the drive shaft 2 of an electric motor 3, comprises a cylinder 4, the rear portion 5 of the bore 6 of which is smooth while its forward portion 7 is provided with a tap 8. For mounting the device 1 in operative condition it is slid longitudinally upon the shaft 2, and is thereto secured by means of set-screws 9 threading therethrough and against the shaft, as shown. The device 1 is made by means of die-casting, and integrally therewith is formed at its end a pulley 10 for a drive belt, the diameter of this pulley being that requisite for the most commonly required speed of the machine to be operatively driven by the motor. For any other speeds at which the said machine may have to be operated, there is provided a plurality of individual pulleys 11 of various diameters, Fig. 3, each provided with a central bore 11a. Mounting any one of the pulleys 11, for therewith driving the machine by the motor-shaft 2, requires merely placing it concentrically against the pulley 10 and passing a screw 12 through its bore 11a and threading it into the tap 8 of device 1, the screw 12 having a suitable head 13 and a flange 14 being preferably interposed between it and the pulley 11.

As illustrated in Fig. 3, three additional individual pulleys 11 are shown secured to the device 1, of progressively increased diameters or speeds over the integral pulley 10, but where the operation of the machine may require it only one such pulley may be selected and secured to the device with the bolt 12, and such additionally selected pulley or pulleys may be of smaller diameter than that of the pulley 10. Likewise, if thereafter the operation of the machine may no longer require resort to speed varying from that of integral pulley 10, then such additional pulley or pulleys may be entirely removed from the device 1 for more advantageous operation of the motor and machine.

Having thus described my invention, I claim:

A device for mounting selective multiple pulleys upon an electric motor drive shaft comprising a pulley normally required for driving a specific machine having rearwardly thereof and integrally therewith a cylinder, said pulley and cylinder having a bore clear therethrough, the bore in said cylinder having a portion thereof adapted to slide longitudinally over said motor drive shaft, means for removably securing said cylinder to said shaft, said bore being tapped, and said tapped portion being adapted for thereinto threading a screw for therewith selectively securing to said pulley one or more individual drive pullleys of varying diameters, for occasional different speeds required by said machine.

BENJAMIN DOWICK.

REFERENCES CITED

The following references are of record in the file of this patent:

UNITED STATES PATENTS

| Number | Name | Date |
|---|---|---|
| 270,672 | Hughes | Jan. 16, 1883 |
| 319,968 | Fish | June 16, 1885 |
| 322,423 | Corey | July 21, 1885 |

FOREIGN PATENTS

| Number | Country | Date |
|---|---|---|
| 13,058 | Sweden | Of 1901 |
| 4,564 | Great Britain | July 3, 1913 |